(12) United States Patent
Boeyen et al.

(10) Patent No.: US 6,675,296 B1
(45) Date of Patent: Jan. 6, 2004

(54) INFORMATION CERTIFICATE FORMAT CONVERTER APPARATUS AND METHOD

(75) Inventors: Sharon M. Boeyen, Stittsville (CA); James Steven Lloyd, Stittsville (CA); Ronald J. Vandergeest, Kanata (CA)

(73) Assignee: Entrust Technologies Limited, Ottawa (CA)

( * ) Notice: Subject to any disclaimer, the term of this patent is extended or adjusted under 35 U.S.C. 154(b) by 0 days.

(21) Appl. No.: 09/340,307

(22) Filed: Jun. 28, 1999

(51) Int. Cl.$^7$ .................................................. H04L 9/00
(52) U.S. Cl. ....................................... 713/156; 713/175
(58) Field of Search ................................ 713/156, 175; 707/523, 524, 517, 511

(56) References Cited

U.S. PATENT DOCUMENTS 5,291,243 A * 3/1994 Heckman et al. .............. 399/3
6,016,380 A * 1/2000 Norton ......................... 386/52

OTHER PUBLICATIONS

M. Rubia, Interoperability between the X.509 and EDIFACT Public Key Infrastructures, 1998, ACM Press, vol. 19, Issue 3, pp. 53–55.*

* cited by examiner

Primary Examiner—Gilberto Barrón
Assistant Examiner—Benjamin E Lanier
(74) Attorney, Agent, or Firm—Vedder, Price, Kaufman & Kammholz, P.C.

(57) ABSTRACT

A certificate issuing apparatus and method creates a new certificate of a differing format from an existing certificate format to facilitate certificate conversion. A certificate converting unit receives first certificate data in a first format and desired certificate format criteria data, such as data representing the format of a certificate to which the first certificate is to be converted. The apparatus and method then generates second certificate data in a second format in response to the desired certificate format criteria data. In one embodiment, this is done using certificate format template data, such as templates representing the format and/or syntax of a plurality of differing certificate formats. The format template data is then mapped so that information from one certificate can be suitably mapped and then placed in a proper format and syntax for a different certificate format.

31 Claims, 7 Drawing Sheets

INFORMATION CERTIFICATE FORMAT CONVERTER APPARATUS AND METHOD

FIELD OF THE INVENTION

The invention relates generally to information certificate issuing apparatus and methods and more particularly to information certificate format converting apparatus and methods.

BACKGROUND OF THE INVENTION

With the increase in electronic commerce and other information dissemination systems, the need to protect information has become critical. As a result, symmetric key cryptosystems and public key based cryptosystems have found increasing usage. As known in the art, data structures such as certificates are generated by a certificate issuing unit, referred to as a certification authority, that is trusted by entities communicating information. For example, in public key infrastructures, a certificate may be generated in a format consistent with the public-key certificate format defined in the specification commonly referred to as X.509 and formally known as ITU-T Recommendation X.509 ISO/IEC 9594-8, Information Technology—Open Systems Interconnection—The Directory: Authentication Framework. As known, such certificates include, among other things, the public key of an entity such as a software application, node in a network, stand alone processing unit, end-user or other entity, wrapped in a digital signature format by a private key of a certification authority. In known public key cryptographic systems, for example, digital signature key pairs (a private key and a public key) are used to create and authenticate a digital signature of a subscriber to ensure that a message sent by a subscriber actually came from the subscriber sending the message. In addition to digital signature key pairs, encryption key pairs are also generally used to encrypt and decrypt the data being sent from one subscriber to another subscriber. Certificates are generated by a certification authority for the public keys of the private/public key pair to certify that the keys are authentic and valid. Public keys and certificates are used for two main purposes: verifying digital signatures and encrypting information. In many cases, two separate key pairs are used to support these services. Specifically, one key pair is used to support digital signature generation and verification and the other key pair is used to support encryption and decryption. The receiver of a digitally signed e-mail or other documents, for example, uses the public key in the sender certificate to verify the digital signature of the sender. A user wishing to send encrypted e-mails or other information first encrypts the e-mail with a random symmetric key, then uses the intended receiver's public key to encrypt the symmetric key and then attaches the encrypted symmetric key to the encrypted e-mail so that the receiver can decrypt the e-mail.

Other information security systems may allow each subscriber to generate certificates for one another. One example of such a system is based on pretty good privacy (PGP) technology as known in the art. These systems use differing certificate formats. A problem arises when subscribers that use certificates having different formats wish to communicate information. There is an incompatibility among certificate formats so that subscribers and certificate issuing units are only capable of analyzing a certificate format native to their security infrastructure. As such, a certificate validation engine cannot validate a certificate when the certificate has an unknown syntax.

Moreover, different versions of the same basic format, such as X.509 version 1, version 2 and version 3 certificates may include different information. As such, systems may require additional separate validation engines wherein one is dedicated to validate each different type of version of certificate. This is especially true where additional information may be present such as with version 2 or version 3 certificiates.

One mechanism for overcoming the incompatibility problem is to issue all users a plurality of different certificates in the different formats expected to be used among differing security information infrastructures. However, such a system may require an enormous amount of overhead and storage capabilities, particularly when hundreds of thousands of users may desire to communicate in such a system. Alternatively, incompatibility may be overcome by having all consumers of the certificates be able to validate all expected formats. Again, this may require that each subscriber have additional capabilities to provide validation of numerous different certificate formats. This again can add unnecessary overhead costs to each subscriber unit and further unnecessarily complicate the security operation of the subscriber.

Consequently, a need exists for a certificate issuing apparatus and method that facilitates compatibility among users of certificates having differing data structures and/or different syntaxes of certificate information. Such a system should provide suitable compatibility for any suitable certificate including public key certificates, non-public key certificates, verification certificates, encryption certificates, or other desirable certificates.

DETAILED DESCRIPTION OF A PREFERRED EMBODIMENT OF THE INVENTION

Briefly, a certificate issuing apparatus and method creates a new certificate of a differing format from an existing certificate format to facilitate certificate conversion. A certificate converting unit receives first certificate data in a first format and desired certificate format criteria data, such as data representing the format of a certificate to which the first certificate is to be converted. The apparatus and method then generates second certificate data in a second format in response to the desired certificate format criteria data. In one embodiment, this is done using certificate format template data, such as templates representing the format and/or syntax of a plurality of differing certificate formats. The format template data is then mapped so that information from one certificate can be suitably mapped and then placed in a proper format and syntax for a different certificate format. The certificate converting unit may be a part of a subscriber unit, a certification authority, a separate third party unit or any other suitable unit if desired.

In one embodiment, a certificate converting unit utilizes a certificate data parser that generates parsed certificate data from the first certificate data for a certificate formatter. The certificate formatter takes the parsed data and through use of mapping information, converts the data to a second certificate format based on the mapping information. A memory unit contains a certificate format template data and certificate data mapping information to facilitate the conversion. A certificate generator selects a suitable signature format and then applies a suitable digital signature to effectively convert a first certificate in a first format to a different certificate in a different format. If desired, the apparatus and method may use an incoming certificate validator to first validate whether the incoming certificate to be converted is valid prior to undergoing certificate conversion. In addition, a certificate converting unit controller receives certificate conversion rule data, such as data indicating the rules governing whether conversion may take place. The controller may generate enable signals to the parser and certificate generator to suitably enable and disable them, if desired.

Figure 1:
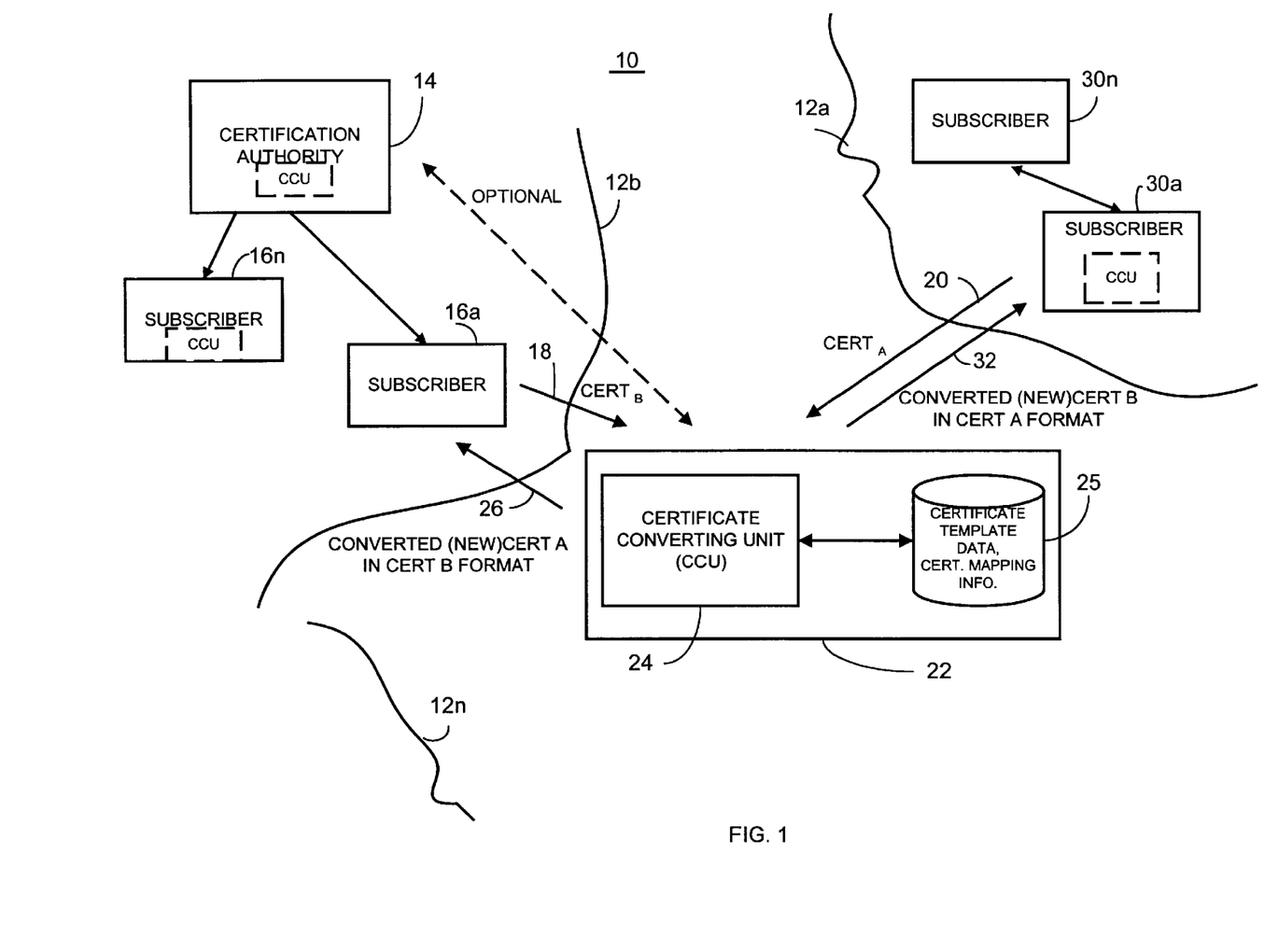
FIG. 1 is a block diagram illustrating one embodiment of a certificate issuing apparatus in accordance with the invention.

FIG. 1 shows an example of an information security system 10 that has at least two different certificate-based security information infrastructures generally shown as 12a and 12b. Information security system 12a may be, for example a PGP based system wherein the subscribers or clients are capable of generating certificates for one another. These certificates are in a first format shown as $CERT_A$ 20. Security information system 12b may be, for example, a public key-based security information system that utilizes certification authorities 14 to generate certificates for subscribers 16a–16n. The public key base certificates generated by certification authority 14, indicated as $CERT_B$ 18, are in a different format and/or have different syntaxes from CERT A 20 in that the certificates either have different data structures and/or different syntaxes in the data structures. For example, CERT B 18 may be an X.509 type certificate. In contrast, CERT A 20 may be a PGP based certificate. A certificate issuing apparatus 22 includes a certificate converting unit 24 and memory 25.

The certificate converting unit 24 receives the certificate data in the first format, such as CERT A 20, and converts the information in CERT A to converted CERT A 26 in CERT B format or syntax. This allows subscriber 30, for example, to provide trusted information to one of clients 16a–16n. Conversely, the certificate converting unit may use as the first certificate data the first format CERT B information 18 and convert it into a new certificate 32 in CERT A format so that the clients 16a–16n can provide certificate for client 30.

The certificate converting unit 24 may be located as part of any of the subscriber 16a–16n or 30a–30n, may be part of the certification authority 14, a stand alone unit or in any other suitable unit. A certificate issuing apparatus 22 may be any suitably programmed data processing unit such as an IBM-compatible PC, handheld portable unit or any other suitable unit if desired. The memory 26 may be a protected data base, suitable repository or any other suitable memory located in the same unit as the certificate converting unit 24 or as a peripheral memory thereto.

Figure 2:
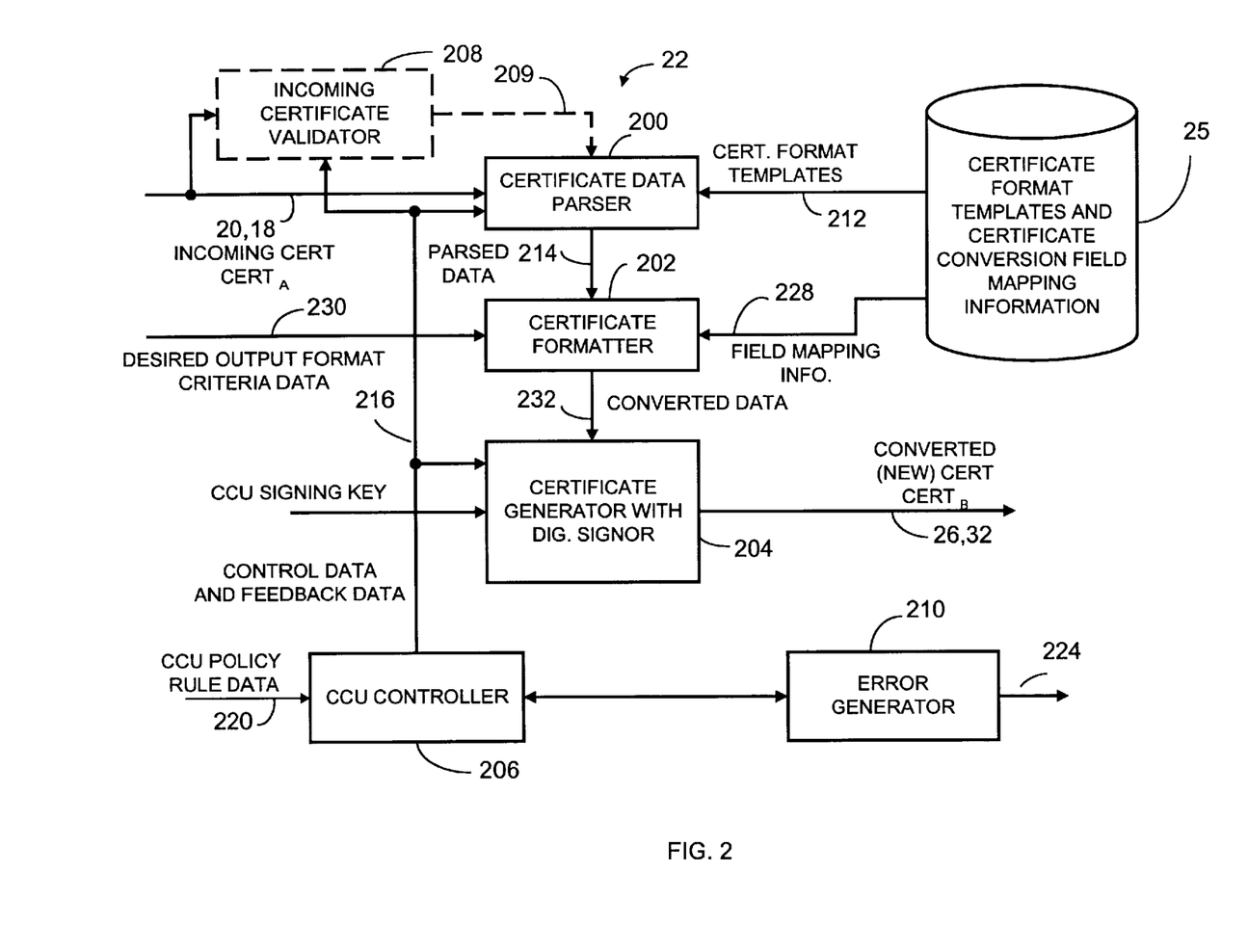
FIG. 2 is a block diagram illustrating one example of a certificate converting unit in accordance with one embodiment of the invention.

FIG. 2 shows one example of the certificate converting unit 24 having a certificate data parser 200, a certificate formatter 202, a certificate generator 204, a certificate converting controller 206, an optional incoming certificate validator 208 and an error generator 210. The certificate converting unit receives incoming certificate data 20 in the first format and generates a new certificate 26 having a different format and/or data syntax. As illustrated, the certificate data parser 200 receives the incoming certificate data 18 as well as certificate format template data 212. The certificate data parser 200 then outputs parsed certificate data 214 for the certificate formatter 202. The certificate format template data 212 includes, for example, templates representing all of the different types of certificates for which the certificate converting unit will convert from and to (see, e.g., FIG. 6.) As used herein, template data may be data in any suitable format or structure that suitably defines data fields of certificates as well as the syntax definition of the information to be placed in the fields as well as signature format data indicative of a format in which the certificate generator 204 digitally signs converted certificate data as further described below with respect to FIG. 6.

If an incoming certificate validator 208 is used, the incoming certificate 18 has its digital signature validated and revocation status checked pursuant to conventional methods depending upon the type of certificate. If the signature suitably validates, the incoming certificate validator 208 provides a validation enable signal 209 to the certificate data parser 200 indicating that the data parser may complete the parsing operation. The certificate converting unit controller 206 generates suitable control signals 216 to the certificate data parser 200, the certificate generator 204 and the incoming certificate validator 208. For example, the control data 216 may use policy rule data to enable each of the respective operations or disable the operations based on certificate converting policy data 220. Certificate converting policy data 220 may include, for example, a list of certificate types that are allowed to be converted. In addition, the certificate data parser 200 and the certificate formatter 202, the certificate generator 204, the controller 206 and the validator 208 may all be operatively coupled to the error generator 210 to generate an error signal 224 due to an error detected by any of the respective operations.

The certificate converting unit 24 generates the converted certificate data 26, 32 in another format and/or syntax based on the certificate format template data 212 and certificate data mapping information 228. The certificate formatter 202 receives desired certificate format criteria data 230 from a given subscriber indicating the desired format for the output certificate data 26, 32. If desired, the certificate format criteria data 230 may be embedded information in a certificate from any other suitable source. The certificate formatter 202 converts parsed data 214 into certificate data in another format or syntax. The different formatted syntax may include a different data structure or different syntax for at least some of the data in the received or incoming certificate 20, 18. The converted data 232 is then communicated to the certificate generator 204. The certificate generator 204 generates an appropriate digital signature consistent with digital signature format data communicated by the formatter 202.

Figure 3:
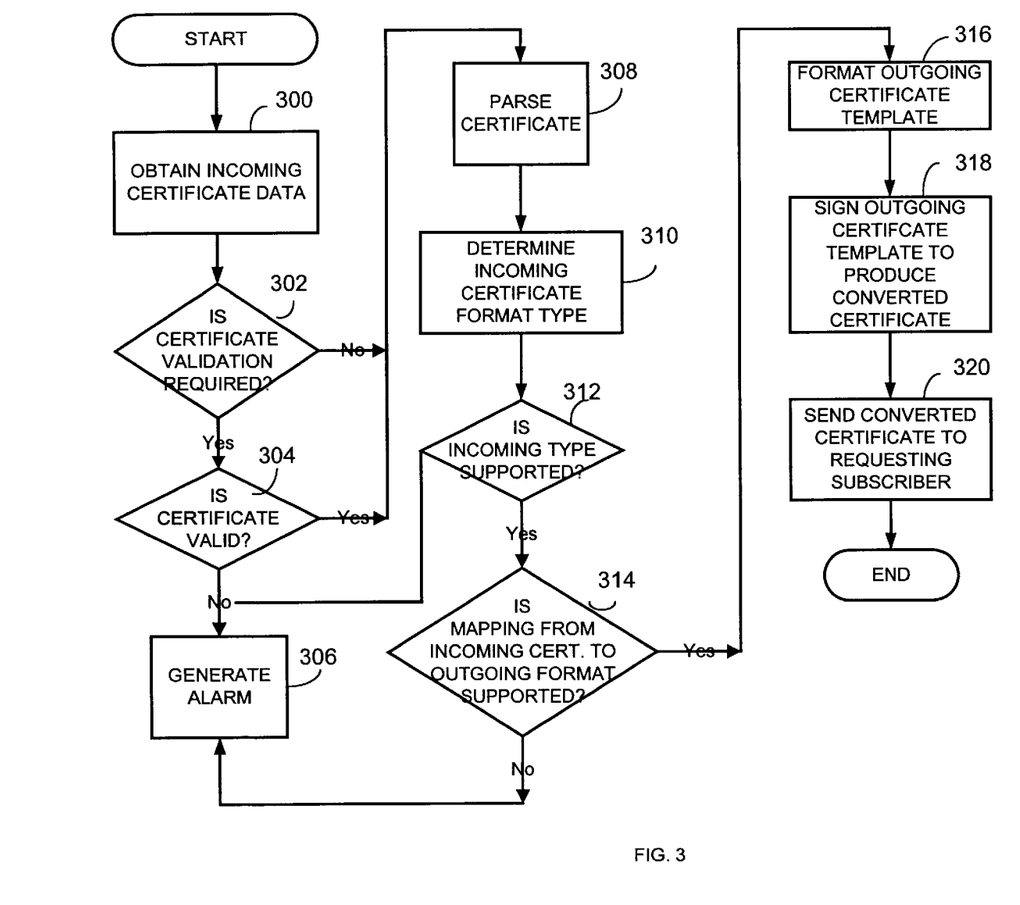
FIG. 3 is a flow chart illustrating the operation of the certificate converting unit of FIG. 2 in accordance with one embodiment of the invention.

In operation, as shown in FIG. 3 the system obtains incoming certificate data as shown in block 300. As shown in block 302, the system may optionally perform certificate validation on the incoming certificate, based on control signals from the CCU controller in response to received CCU policy rule data. If certificate validation is required (block 304), and it fails, an alarm is generated and processing stops. If certification validation is required and succeeds, or is not required, the certificate is parsed, as shown in block 308. The parsed certificate data is analyzed (block 310) to determine the incoming certificate format type. If the type cannot be determined, or is an unsupported type, an alarm is generated and processing stops (block 312). If the incoming certificate type is supported, processing continues. If a mapping from the incoming certificate type to the requested outgoing format is not supported (block 314), an alarm is generated and processing stops. Otherwise, the outgoing certificate template is formatted (block 316), digitally signed to produce an outgoing converted certificate (block 318), and sent to the subscriber originally requesting the certificate conversion (block 320).

Figure 4:
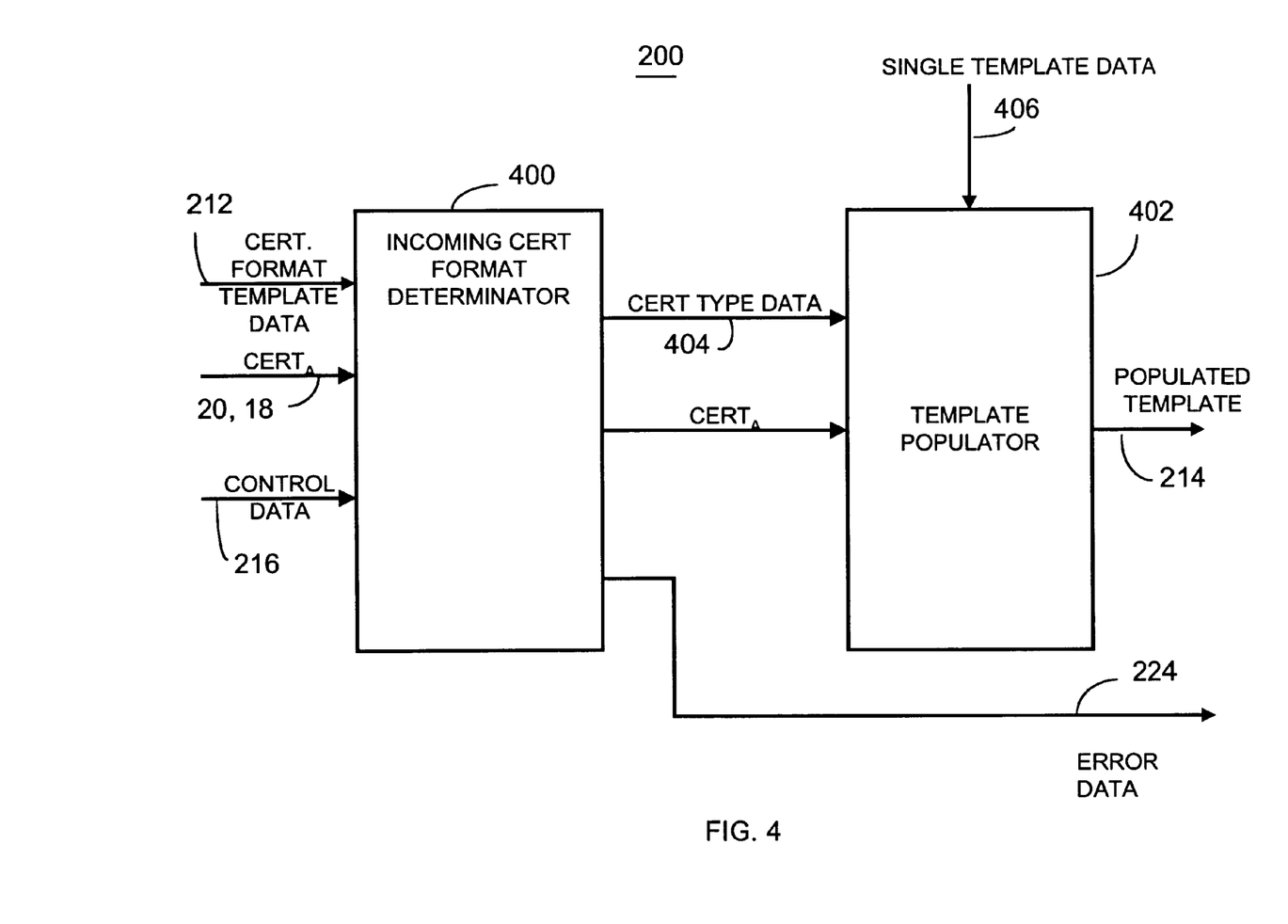
FIG. 4 is a block diagram illustrating one example of a certificate parser in accordance with one embodiment of the invention.

As shown in FIG. 4, one example of the certificate data parser 200 includes an incoming certificate format determinator 400 and a template populator 402. The certificate format determinator 400 receives the certificate format template data 212 which represents the data fields and associated syntax for each different type of certificate expected to be converted by the certificate converting unit. The incoming certificate format determinator 400 also receives the incoming certificate data 20, 18 and scans the incoming certificate data 20, 18 to identify whether it recognizes data associated with one of the templates represented by the certificate format template data 212. As such, the parser 200 detects whether it recognizes the format of components or fields of an incoming certificate. The control data 216 may serve as an enable signal to control whether the given incoming certificate should be parsed or, for example, whether to pass the parsed information to the certificate formatter 202. As such, the certificate converting unit may be controllable to limit the types of certificates that it is allowed to convert or, for example, be controlled to cease operation at various levels, if desired, to facilitate flexibility in reducing processing overhead should conversion become unnecessary. In addition, the control signal 216 based on the policy rule data allows an administrator, for example, to provide selective control as to the various operations of the certificate converting unit.

The incoming certificate format determinator 400 determines, for example, whether all scanned fields match with a stored template or whether only certain of the fields match, in which case additional fields may be tacked onto the end of the newly generated certificate to allow some changes in certificate format to occur but still requiring essential components of the certificate to be present. The data within the certificate that is the incoming certificate is passed to the template populator 402. In addition, the incoming certificate format determinator 400 generates data representing certificate type data. Certificate type data may be data representing, for example, whether the incoming certificate 20, 18 is an X.509 type, PGP type, or other type. This data is generated based on whether a match occurs with any of the certificate format template data 212 and the incoming certificate format. If a match occurs, the certificate type that matches is represented by the certificate type data 404. The template populator 402 receives the certificate type data 404 and also receives single template data 406 which is obtained based on the certificate type data. For example, the parser will access the specific single template corresponding to the template type indicated by the certificate type data 404 from the memory 25. The template populator then populates the single template to generate the parsed data 214. The single template data 406 may be partially populated from the partial amount of the fields that where present from the original or incoming certificate data. In addition, additional data may be tacked onto the end of the certificate if additional data has been sent in the incoming certificate that is not defined in the single template. Hence, the template populator populates the single template identified by the certificate type data using data from the first certificate.

Figure 5:
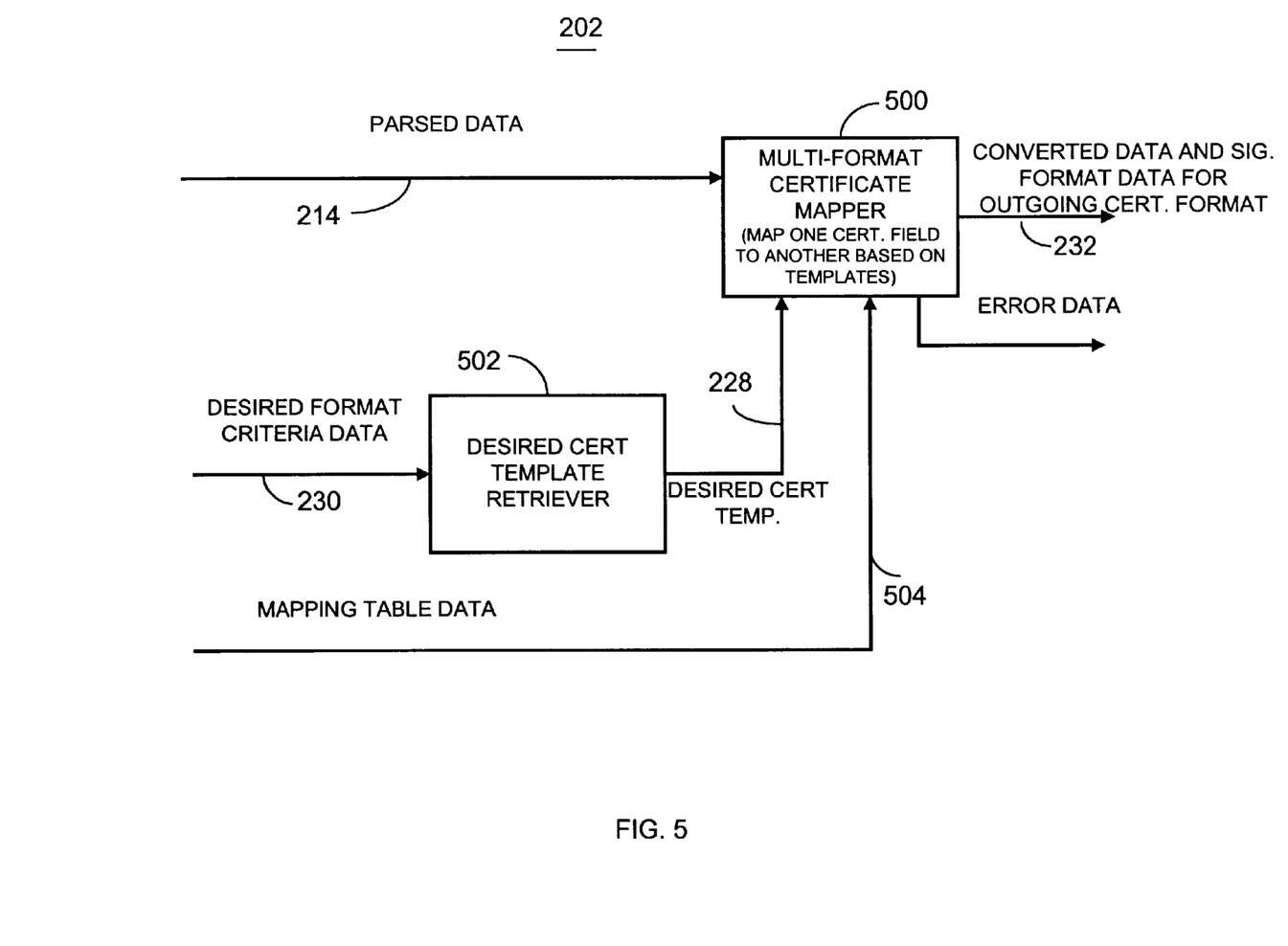
FIG. 5 is a block diagram illustrating one example of a certificate formatter in accordance with one embodiment of the invention.

Referring to FIG. 5, one example of certificate formatter 202 is shown having a multi-format certificate mapper 500 and an outgoing certificate template retriever 502. The multi-format certificate mapper 500 maps a plurality of first certificate data such as fields and associated syntax requirements to a different certificate format or syntax based on mapping information 504 obtained from storage unit 25. In addition, the multi-format certificate mapper 500 also maps the parsed data based on the desired format of the new certificate. The desired format criteria data 230 is data that represents the format of the new certificate. The outgoing certificate template retriever 502 obtains the desired certificate template from memory 25 and provides the output or desired certificate template 228 to the multi-format mapper. The multi-format certificate mapper 500 maps one certificate data element to another based on the desired certificate template and the parsed data 214 to generate the converted data 232. Hence, the multi-format certificate mapper 500 maps a plurality of first certificate data to a different certificate formatter syntax based on the mapping information in a desired certificate format criteria data. The converted data 232 includes data representing a format of a digital signature to be generated as part of the desired certificate. Hence the mapper also provides this information which is typically included in the desired certificate template 228.

Figure 6:
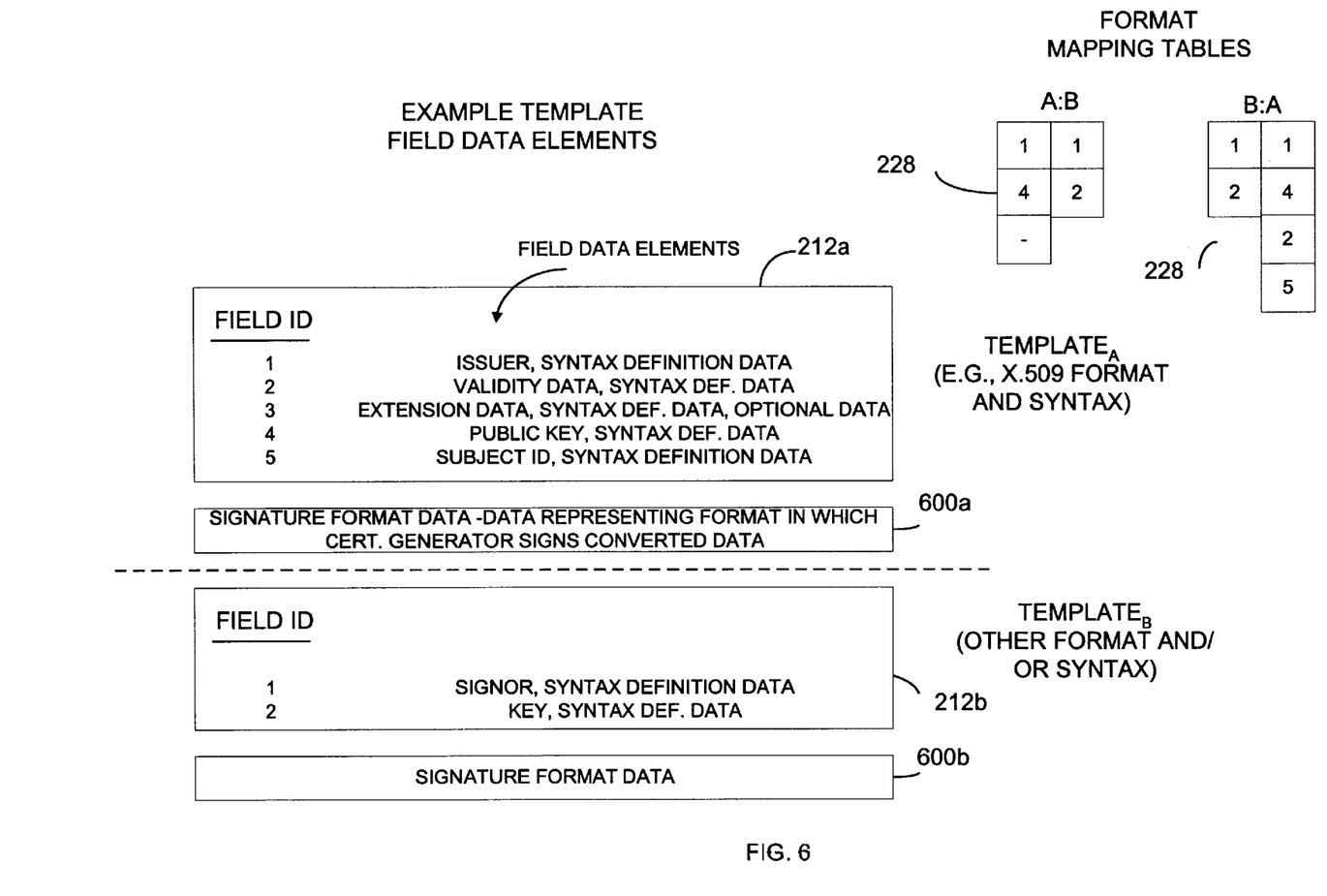
FIG. 6 is a graphic illustration showing a plurality of certificate templates and corresponding mapping information in accordance with one embodiment of the invention.

Referring to FIGS. 2–6, certificate format template data 212a–212b (as shown in FIG. 6) is different for different certificates. For example, one certificate type may have five mapped fields each having a field data element and associated syntax definition data. Another template, such as template 212b may have only two fields having differing field data elements and different corresponding syntax definition data. The mapping information 228 stored in memory, may be a mapping table that maps from template 212a to 212b and vice versa. In this example, the mapper maps the first field from template 212a to the first field of template 212b to allow the corresponding syntax definition data. Also, when mapping from format A to format B, the mapping information 228 (e.g., mapping table) maps field four of template 212a to field two of template 212b since both relate to keys that are used although they may have different field data as well as different syntaxes. (although not shown, the syntax definition data is also mapped.) In addition, the templates 212a also includes signature format data 600 which indicates the format in which the certificate generator signs the converted data to generate the new certificate 26, 32. As such, different signature techniques may be required since different keys may be used.

Since different templates may have different data and syntaxes, a resulting template may include mapped fields, unmapped fields and signature format data. As shown in the example, CERTA requires data that CERTB does not have (template B has fewer fields than template A). Therefore, mapping tables may map default values where no corresponding fields are found, or may simply add fields at an end of a certificate if desired.

Figure 7:
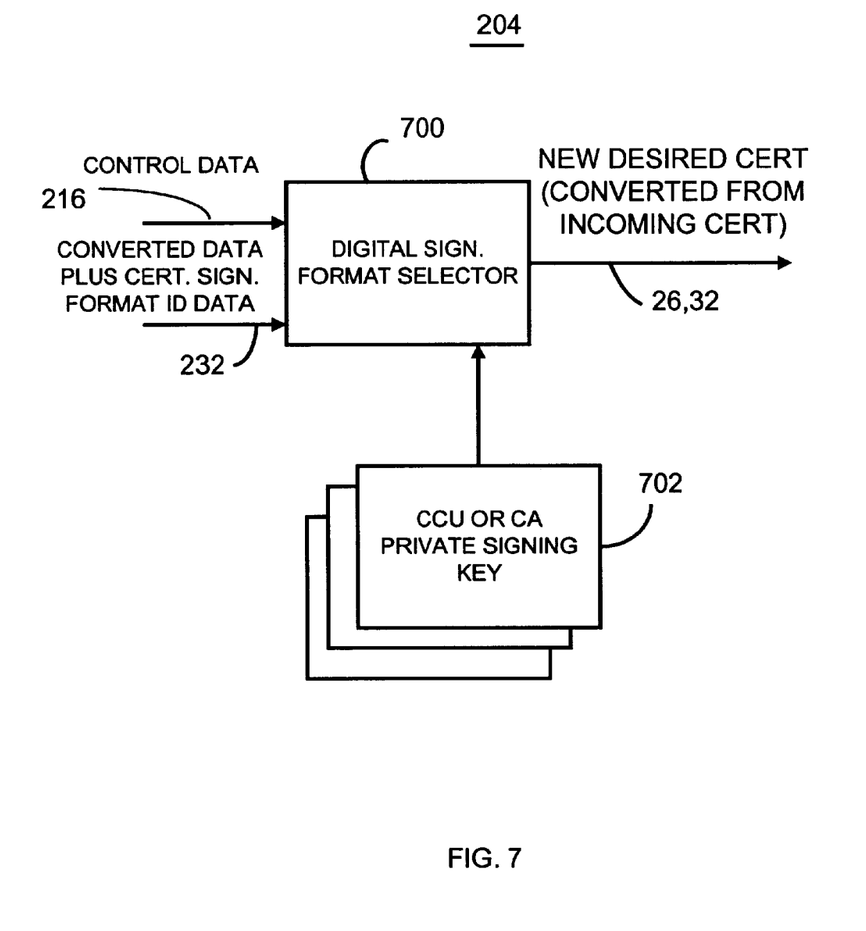
FIG. 7 is a block diagram illustrating one example of a certificate generator in accordance with one embodiment of the invention.

FIG. 7 shows an example of the certificate generator 204 having a digital signature format selector 700 and a plurality of private keys 702 wherein each of the private keys may be associated with the certificate converting unit, a certificate authority or any other unit that is performing the new certificate generation. The certificate generator 204 employs one of the plurality of the private signing keys 702 in response to a selected signature format. The certificate generator 204 receives the converted data 232 which includes the certificate signature format ID data 600. The digital signature format selector 700 then selects the appropriate private key based on which format ID data has been received. For example, where the signature format data indicates that an X.509 type signature should be used, the digital signature format selector then selects the private key of the issuing unit associated with an X.509 security engine or certificate generation engine. The control data 216 may enable to the digital signature format selector 700 to indicate which private key to use and/or serve as an enable/disable signal to prevent the certificate 26, 32 from being generated. The digital signature format selector 700 includes a plurality of different conventional signature generating algorithms corresponding to the type of signature required for a given certificate format and/or syntax.

In an alternative embodiment, the disclosed system may be used to provide backward compatibility among similar format certificates having different versions. For example, the certificate converter may be used to generate an X.509 Ver. 1 certificate from an X.509 Ver. 3 certificate by mapping to a subset of the same format by suitably providing the templates, field definitions and syntax definitions.

The above-identified system allows users of differing security infrastructures to communicate information using their respective certificates even though the certificates are in different formats since the converter will convert to the appropriate format. The certificate converting unit and the components herein as described may be suitably programmed software processing devices or logic. The certificate data parser, the certificate formatter, certificate generator, controller, validator and error generator may all be implemented by a combination of software and hardware as known in the art by programming suitable processing units to perform the operations as herein described.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A certificate issuing apparatus comprising:
   a certificate converting unit operatively coupled to receive first certificate data in a first format, and desired certificate format criteria data; and
   memory operatively accessible by the certificate converting unit, containing certificate format template data and certificate data mapping information,
   wherein the certificate converting unit generates second certificate data in a second format in response to at least the first certificate data, the certificate format template data and the certificate mapping information;
   a certificate formatter operatively responsive to the desired certificate format criteria data and operative to convert the first certificate data into second certificate data wherein the second certificate data includes at least one of a different data structure and a different syntax for at least some data in the first certificate; and
   a certificate generator, operatively coupled to the certificate formatter, including a digital signature format selector operative to select among a plurality of signature formats to facilitate certificate conversion between the first certificate data and the second certificate data.

2. The apparatus of claim 1 wherein the certificate formatter is also operatively responsive to certificate mapping information.

3. The apparatus of claim 1 wherein the certificate converting unit includes a certificate data parser operatively responsive to the first certificate data and operatively responsive to the certificate format template data that generates parsed certificate data for a certificate formatter.

4. The apparatus of claim 3 wherein the certificate data parser includes a first certificate format determinator responsive to the certificate format template data and the first certificate data, that generates data representing certificate data type.

5. The apparatus of claim 4 wherein the certificate data parser includes a template populator, operatively responsive to the certificate type data and to single template data obtained based on the certificate type data using data from the first certificate.

6. The apparatus of claim 1 wherein the certificate formatter includes a multi-format certificate mapper that maps a plurality of first certificate data to a different certificate format or syntax based on mapping information and the desired certificate format criteria data.

7. The apparatus of claim 6 wherein the multi-format certificate mapper also provides digital signature format data representing a format of a digital signature to be generated as part of the second certificate data.

8. The apparatus of claim 6 wherein the mapping information is based on first certificate template data including first field data elements and associated first syntax definition data and second certificate template data including second field data elements and associated second syntax definition data.

9. The apparatus of claim 8 wherein the first certificate template data and the second certificate template data each include different digital signature format data.

10. A certificate issuing apparatus comprising:
    a certificate formatter operatively responsive to desired certificate format criteria data and operative to convert first certificate data into second certificate data wherein the second certificate data includes at least one of a different data structure and a different syntax for at least some data in the first certificate; and
    a certificate generator, operatively coupled to the certificate formatter, including a digital signature format selector operative to select among a plurality of signature formats to facilitate certificate conversion between the first certificate data and the second certificate data.

11. The apparatus of claim 10 including a certificate data parser operatively responsive to the first certificate data and operatively responsive to the certificate format template data that generates parsed certificate data for a certificate formatter.

12. The apparatus of claim 11 including a controller operatively responsive to certificate converting rule data, that generates a certificate generator control signal and a certificate parser control signal in response to the certificate converting rule data.

13. The apparatus of claim 11 wherein the certificate data parser includes a first certificate format determinator responsive to the certificate format template data and the first certificate data that generates data representing certificate type data.

14. The apparatus of claim 13 wherein the certificate data parser includes a template populator, operatively responsive to the certificate type data and to single template data obtained based on the certificate type data, that populates the single template identified by the certificate type data using data from the first certificate.

15. The apparatus of claim 11 wherein the certificate formatter includes a multi-format certificate mapper that maps a plurality of first certificate data to a different certificate format or syntax based on mapping information and the desired certificate format criteria data.

16. The apparatus of claim 15 wherein the multi-format certificate mapper also provides digital signature format data representing a format of a digital signature to be generated as part of the second certificate data.

17. The apparatus of claim 15 wherein the mapping information is based on first certificate template data including first field data elements and associated first syntax definition data and second certificate template data including second field data elements and associated second syntax definition data.

18. The apparatus of claim 17 wherein the first certificate template data and the second certificate template data each include different digital signature format data.

19. The apparatus of claim 11 including a certificate validator operative to perform validation on the first certificate data prior to commencing parsing by the parser.

20. The apparatus of claim 15 including memory, operatively coupled to the certificate formatter and to the certificate data parser, containing the mapping information and the certificate format template data.

21. The apparatus of claim 10 wherein the certificate generator accesses one of a plurality of private signing keys in response to a selected signature format.

22. A certificate issuing method comprising the steps of:
receiving first certificate data in a first format, and desired certificate format criteria data;
generating second certificate data in a second format in response to at least the certificate format template data and the certificate mapping information;
converting the first certificate data into second certificate data wherein the second certificate data includes at least one of a different data structure and a different syntax for at least some data in the first certificate; and
selecting among a plurality of signature formats to facilitate certificate conversion between the first certificate data and the second certificate data.

23. The method of claim 22 including generates parsed certificate data for a certificate formatter based on the first certificate data and the certificate format template data.

24. The method of claim 23 including generating data representing certificate type data based on the certificate format template data and the first certificate data.

25. The method of claim 24 including populating the single template identified by the certificate type data using data from the first certificate based on the certificate type data.

26. A certificate issuing method comprising the steps of:
receiving first certificate data in a first format, and desired certificate format criteria data;
generating second certificate data in a second format in response to at least the certificate format template data and the certificate mapping information; and
mapping a plurality of first certificate data to a different certificate format or syntax based on mapping information and the desired certificate format criteria data.

27. The method of claim 26 including providing digital signature format data representing a format of a digital signature to be generated as part of the second certificate data.

28. The method of claim 27 wherein the mapping information is based on first certificate template data including first field data elements and associated first syntax definition data and second certificate template data including second field data elements and associated second syntax definition data.

29. The method of claim 28 wherein the first certificate template data and the second certificate template data each include different digital signature format data.

30. The method of claim 28 including performing validation on the first certificate data prior to commencing parsing.

31. The method of claim 28 including accessing one of a plurality of private signing keys in response to a selected signature format.

* * * * *